United States Patent
Brooker

(10) Patent No.: US 11,933,959 B2
(45) Date of Patent: Mar. 19, 2024

(54) HIGH DYNAMIC RANGE IMAGING

(71) Applicant: Thorlabs, Inc., Newton, NJ (US)

(72) Inventor: Jeffrey S. Brooker, Manassas, VA (US)

(73) Assignee: Thorlabs, Inc., Newton, NJ (US)

(*) Notice: Subject to any disclaimer, the term of this patent is extended or adjusted under 35 U.S.C. 154(b) by 856 days.

(21) Appl. No.: 16/778,095

(22) Filed: Jan. 31, 2020

(65) Prior Publication Data

US 2020/0249457 A1 Aug. 6, 2020

Related U.S. Application Data

(60) Provisional application No. 62/800,160, filed on Feb. 1, 2019.

(51) Int. Cl.
| | |
|---|---|
| *G02B 21/36* | (2006.01) |
| *G01N 21/64* | (2006.01) |
| *G02B 5/30* | (2006.01) |
| *G02B 21/16* | (2006.01) |
| *G02B 27/10* | (2006.01) |
| *G02B 26/10* | (2006.01) |

(52) U.S. Cl.
CPC ....... *G02B 21/361* (2013.01); *G01N 21/6458* (2013.01); *G02B 5/3083* (2013.01); *G02B 21/16* (2013.01); *G02B 27/1013* (2013.01); *G02B 26/105* (2013.01)

(58) Field of Classification Search
CPC .... G02B 21/361; G02B 5/3083; G02B 21/16; G02B 27/1013; G02B 26/105; G02B 21/0084; G02B 21/365; G01N 21/6458
USPC .......................................................... 359/368
See application file for complete search history.

(56) References Cited

U.S. PATENT DOCUMENTS 5,337,333 A * 8/1994 Daly ..................... H01S 3/0057
372/700
2009/0066963 A1 3/2009 Petek et al.

FOREIGN PATENT DOCUMENTS

| JP | 2007132794 A | 5/2007 | |
|---|---|---|---|
| WO | WO-2017202980 A1 * | 11/2017 | ......... G01N 21/6408 |
| WO | 2018/081711 A1 | 5/2018 | |

(Continued)

OTHER PUBLICATIONS

International Search Report issued for corresponding International Patent Application No. PCT/US 2020/016071, dated May 21, 2020.

(Continued)

*Primary Examiner* — Balram T Parbadia
*Assistant Examiner* — Rahman Abdur
(74) *Attorney, Agent, or Firm* — Myers Wolin, Inc.

(57) ABSTRACT

A system for generating a series of reducing intensity laser pulses from an ultrafast pulsed laser source. The reducing intensity series of pulses is equally temporally spaced between pulses from the laser source. The repeating series of reducing intensity laser pulses is fed to a microscope for imaging. The microscope is capable of detecting the fluorescence from a sample generated by each pulse in the series. The data is processed using knowledge of the pulse intensity, location on the test sample, and amount of fluorescence measured to create an increased dynamic range of the image relative to what can be obtained in a normal two-photon imaging system.

25 Claims, 4 Drawing Sheets

(56) References Cited

FOREIGN PATENT DOCUMENTS

WO     WO-2018081711 A1 * 5/2018 ......... G01N 21/6408

OTHER PUBLICATIONS

Written Opinion issued by the International Searching Authority for corresponding International Patent Application No. PCT/US 2020/016071, dated May 21, 2020.
Requisition by the Examiner issued for Canadian Patent Application No. 3,127,800, dated Mar. 7, 2023.

* cited by examiner

HIGH DYNAMIC RANGE IMAGING

CROSS REFERENCES TO RELATED APPLICATIONS

This application claims the benefit of U.S. Provisional Patent Application No. 62/800,160 filed on Feb. 1, 2019. The disclosure and entire teachings of U.S. Provisional Patent Application 62/800,160 are hereby incorporated by reference.

FIELD OF THE INVENTION

The present invention relates to microscopy, and more specifically to a system and method for high dynamic range imaging in multi-photon microscopy.

BACKGROUND

Molecular excitation by the simultaneous absorption of two photons (or multiple photons) provides intrinsic three-dimensional resolution in laser scanning fluorescence microscopy. Two-photon microscopy and multi-photon microscopy have been used extensively to measure dynamic processes, such as calcium dynamics, in populations of neurons in the intact brain, even during animal behavior.

Photodetectors that detect light down to the single photon level, such as photomultiplier tubes (PMTs) and silicon photomultipliers (SiPMs), are commonly used in two-photon microscopy systems, due to their low cost, high sensitivity and wide coverage of wavelengths. In fluorescence microscopy, upon excitation, some structures of a sample can fluoresce more photons and other structures. For example, when imaging neuron activities, the tissue body is a lot brighter than the activities in the neural networks. The ability of imaging a structure of a sample depends on the number of photons detected by a detector, as well as the background signal. In order to detect a faint structure in the sample, the gain of the detector needs to be increased, or the integration time increased. However, the gain or integration time increase is limited by the brightest object in the sample, as the photons emitted by the brightest object would saturate the detection system, including detector, amplifier and digitizer, etc., if the gain or integration time is adjusted too high. Thus, the photodetectors, amplifiers and digitizers used in fluorescence microscopy have a limited detection dynamic range, as it is bounded by the maximum and minimum intensities that can be simultaneously detected within a field of view. Current imaging techniques can provide up to about 14-bit of dynamic range. However, a high dynamic range of 22 to 24-bit is desired in some imaging applications, such as optical imaging of neural activities and fine neural structures. Therefore, there is a need for a method to overcome the above limitation, so that high dynamic range imaging of a sample can be performed.

SUMMARY

An embodiment of the present invention provides an imaging system including: a light source configured to generate successive light pulses of diminishing intensity having a pulse interval; and a microscopy system configured to image a sample and to process signals detected from the sample based on intensities of the successive light pulses.

Further with an imaging system, an embodiment of the present invention provides a light source configured to generate a series of reducing intensity laser pulses, including: a pulse laser configured to generate light pulses having a repetition interval; a first beam splitter configured to receive a light pulse and to direct a first percentage of the light pulse onto a delay loop and output a second percentage of the light pulse; wherein the delay loop is configured to direct the first percentage of light pulse back to the first beam splitter with a time delay; and wherein the system is configured to, by having continued looping of a light pulse in the delay loop, output successive light pulses of diminishing intensity with a pulse interval being equal to the time delay.

Further with an imaging system, an embodiment of the present invention provides a microscopy system including: a sample objective; a detector; and one or more optical elements configured to direct the successive light pulses to the sample objective; wherein the sample objective is configured to focus the successive light pulses at a focal plane within a sample; wherein the detector is configured to detect light emitted from the focal plane within the sample in response to the focused successive light pulses.

An embodiment of the present invention provides an imaging method including: generating, by a light source, successive light pulses of diminishing intensity having a pulse interval; and imaging a sample and processing signals detected from the sample based on intensities of the successive light pulses.

Further with an imaging method, an embodiment of the present invention provides a method for generating a series of reducing intensity laser pulses, including: generating, by a pulse laser, light pulses having a repetition interval; receiving, by a first beam splitter, a light pulse and directing a first percentage of the light pulse onto a delay loop and outputting a second percentage of the light pulse; directing, by the delay loop, the first percentage of light pulse back to the first beam splitter with a time delay; and by having continued looping of a light pulse in the delay loop, outputting successive light pulses of diminishing intensity with the pulse interval being equal to the time delay.

Further with an imaging method, an embodiment of the present invention includes: directing, by one or more optical elements, the successive light pulses to a sample objective; focusing, by the sample objective, the successive light pulses at a focal plane within a sample; detecting, by a detector, light emitted from the focal plane within the sample in response to the focused successive light pulses

DETAILED DESCRIPTION OF THE PREFERRED EMBODIMENTS

Figure 1:
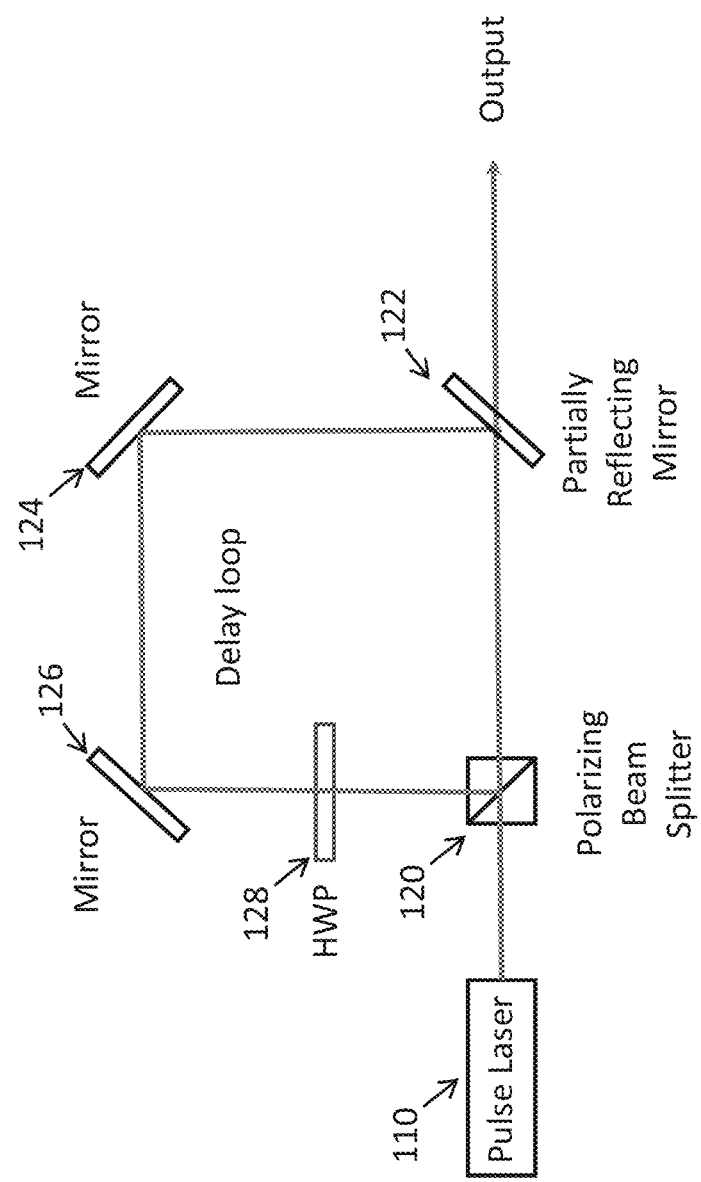
FIG. 1 shows a diagram of a light source for generating a series of reducing intensity laser pulses according to an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

Figure 2:
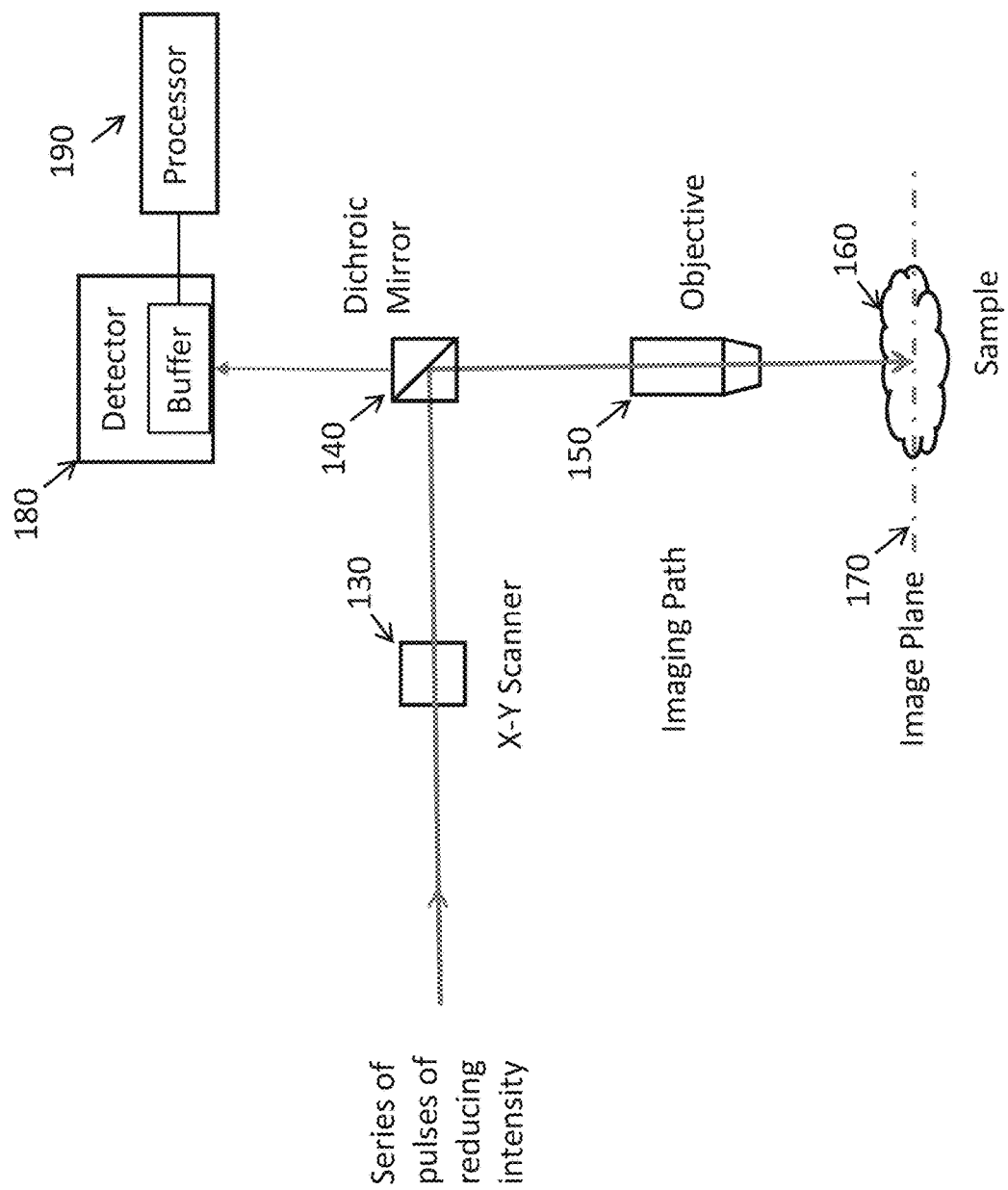
FIG. 2 shows a diagram of an imaging system according to an embodiment.

In one embodiment, an imaging system includes: a light source configured to generate successive light pulses of diminishing intensity having a pulse interval, as shown in FIG. 1; and a microscopy system configured to image a sample and to process signals detected from the sample based on intensities of the successive light pulses, as shown in FIG. 2. FIG. 1 is a diagram of a system for generating a series of reducing intensity laser pulses according to an embodiment. The system includes a pulse laser 110 that generates light pulses having a repetition rate. For example, the pulse laser may be a tunable femtosecond Ti:sapphire laser having a repetition rate around 70 to 90 MHz and a tunable wavelength range of 650 to 1110 nm. It is understood that different specifications or types of pulse lasers may be used depending on the specific application. In one embodiment, the light pulses generated by the pulse laser is directed to a polarizing beam splitter (PBS) 120, and the light pulse that is in a first state of polarization passes through the PBS to reach a beam splitter 122. In one embodiment, the beam splitter 122 is a partially reflecting mirror, for example, a 50/50 mirror. Note that different reflection/transmission ratios, or percentages, such as 60/40, 80/20, etc., are also contemplated, depending on specific requirements. The beam splitter 122 splits the light pulse into two paths: a first percentage to a delay loop and a second percentage to an output. In one embodiment, the output goes on to an imaging path for a microscopy system. As shown in FIG. 2, in the imaging path, there are one or more optical elements for directing the light pulse to a desired location. For example, the one or more optical elements may be a lens, mirror, beam splitter, or scanner, etc., or some combinations of these elements. In one embodiment, an x-y scanner 130 scans the second percentage of the light pulse to cover an area within the plane of a sample 160. By scanning the location within the plane, scanning microscopy can be performed. A dichroic mirror 140 reflects the light pulse into an objective 150. It is noted that a skilled person would be able to use a configuration of one or more optical element, or the equivalents to direct the light to a location within the plane. The objective 150 then focuses the light pulse onto an image plane 170 of a desired depth into the sample 160. It is noted that a skilled person would be able to use a configuration of one or more optical element, or the equivalents to direct the light to a location within the plane. In one embodiment, the wavelength of the laser is selected to cause fluorescence at a focal point in the sample. In one embodiment, the wavelength of the laser is selected to cause a two-photon excitation in the sample. Light emitted by the sample 160 is collected by a detector 180. In one embodiment, the detector is a photomultiplier tube (PMT). In one embodiment, the detector is a silicon photomultiplier (SiPM). In one embodiment, the light emitted by the sample 160 passes through the objective 150 and through the dichroic mirror 140 to reach the detector 160 above. Note that the arrangement of the dichroic mirror and detector shown in FIG. 2 is an example setup only. Other optical elements and/or arrangements are possible to achieve the desired direction of light to the sample and detection of the emitted light from the sample.

In one embodiment, the delay loop includes a path traverses the beam splitter 122 that directs a first percentage of the light pulse to a first mirror 124, which reflects the pulse to a second mirror 126, which reflects the pulse through a half-wave plate 128 to the PBS 120. The half-wave plate 128 changes the pulse to a second polarization state, allowing the PBS 120 to reflect the pulse back to the beam splitter 122. Note that the half-wave plate 128 may be placed anywhere within the path. The arrangement shown in FIG. 1 is an example setup. The delay loop introduces a desired delay time to the first percentage of the light pulse relative to the second percentage of the light pulse. Note that the delay loop setup shown in FIG. 1 is an illustrative example. Other optical elements and/or arrangement may be used to create such a delay loop, or equivalents thereof.

Figure 3:
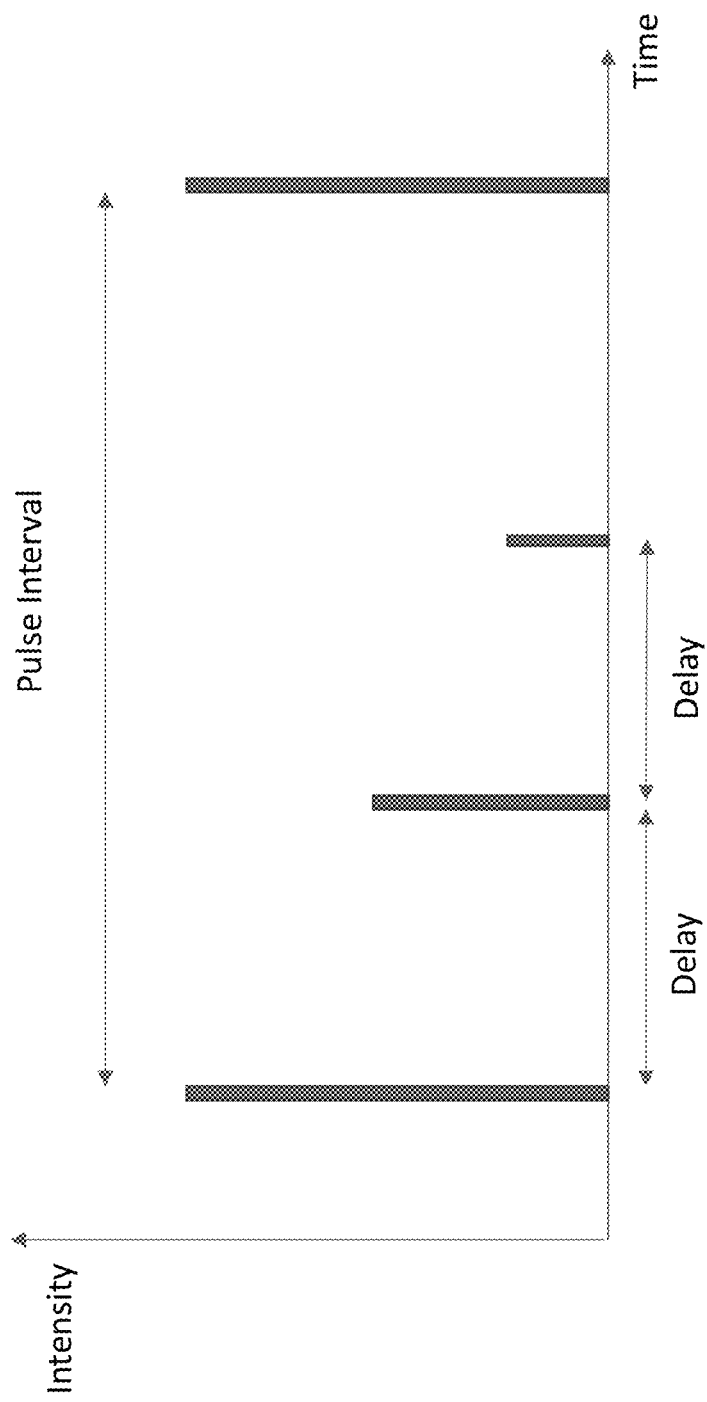
FIG. 3 shows a series of modulated light pulses according to an embodiment.

The beam splitter 122 further splits the delayed light pulse according to its reflection/transmission ratio, and thus the intensity of the delayed light pulse transmitted by the beam splitter 122 is further diminished. Each time the light reflected by the beam splitter 122 into the delay loop would be delayed by the desired delay time as it loops around the delay loop, and the intensity of the light transmitted by the beam splitter 122 would be reduced according to the reflection/transmission ratio of the beam splitter. Thus, a series of delayed pulses of diminishing intensity is generated from the initial light pulse. FIG. 3 is a plot of intensity over time of the modulated light pulses according to an embodiment. As can be seen from FIG. 3, the second light pulse is delayed relative to the first light pulse and the intensity of the second light pulse is less than that of the first light pulse. The third pulse is delayed by the same amount and with its intensity further diminished. The pulses shown in FIG. 3 are for illustration purposes. The number of pulses, their relative intensities, delays, etc., may vary depending on specific setup and application requirements. Note that FIG. 3 also shows a fourth pulse with the same intensity as the first pulse. This fourth pulse is due to a pulse from the pulse laser arriving at the next repetition interval.

Using knowledge of the pulse intensity, location on the test sample, and amount of fluorescence measured, an imaging system according to an embodiment can create an increased dynamic range of the image relative to what can be obtained in a normal two-photon imaging system.

In one embodiment, the detector includes a plurality of temporal buffers which would store signals from the sample. The signal detected by the detector for the fluorescence in response to a focused light pulse may be stored in one of the buffers. If the delay time introduced by the delay loop is selected such that when the delayed pulse arrives at the sample, the fluorescence due to the previous pulse has already substantially subsided, then detected signal due to the fluorescence in response to the focused delayed light pulse may be stored in another buffer. Thus, at each focal point in the sample, the buffers store fluorescence data at different times, each correspond to a light pulse of different intensities. Since the intensity of the fluorescence depends on the intensity squared of the excitation pulse, for some pulse intensities, the light emitted by a structure in the sample may be so high that the buffer is saturated, and for some other pulse intensities, the light emitted by a structure in the sample may be so faint that the signal is not registered. In one embodiment, the imaging system includes a processor 190 configured to select a buffer among the plurality of temporal buffers, where the selected buffer is not saturated by the brightest object. Thus, for each spot, the processor has a choice among different intensity-modulated pulses and can select the excitation intensity that corresponds to the most appropriate dynamic range for that spot. In one embodiment, the processor may select the data in a buffer that corresponds to the highest intensity pulse among those pulses that do not cause buffer saturation.

The choice of the appropriate buffer may be performed in real time as the sample is being scanned by the system. In one embodiment, the processor may include a field programmable gate array (FPGA), which allows programmable logic to be incorporated with high speed and flexibility on the processor.

Figure 4:
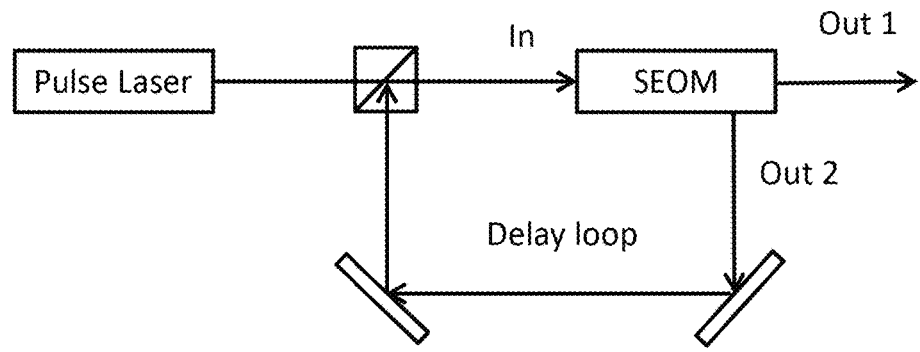
FIG. 4 shows a diagram of a light source for generating a series of reducing intensity laser pulses according to an embodiment.
Figure 5:
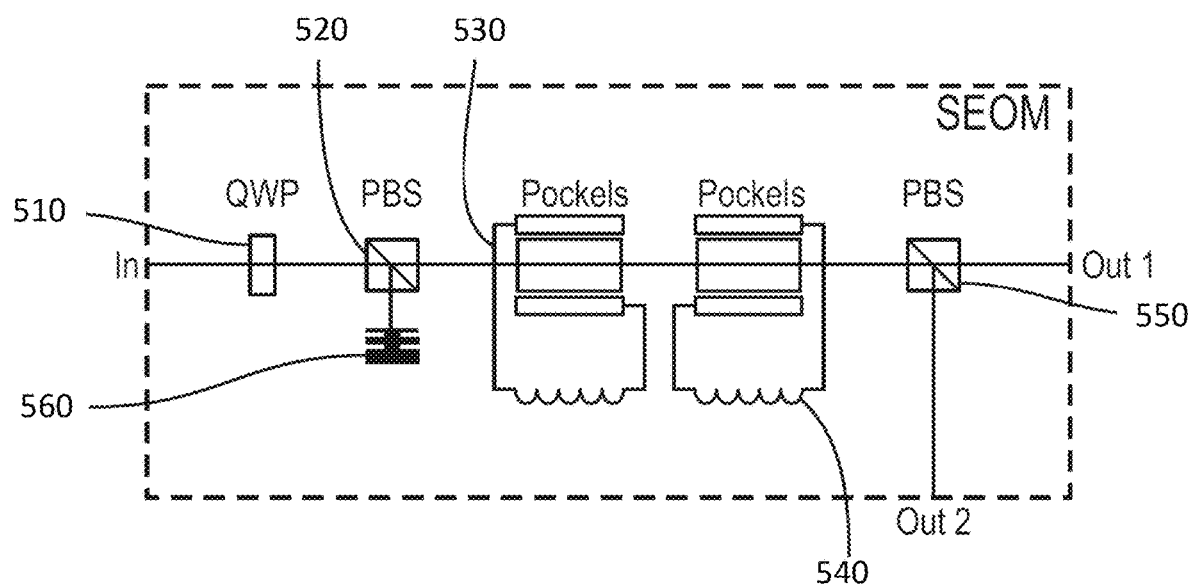
FIG. 5 shows a diagram of a synchronous electro-optic modulator (SEOM) according to an embodiment.

In another embodiment, the creation of a series of pulses of reducing amplitude is realized by a synchronous electro-optic modulator (SEOM) with a delay loop as shown in FIG. 4. FIG. 5 shows an example setup of the SEOM according to an embodiment. A quarter wave plate 510 and a first PBS or polarizer 520 configured to receive an input a pulsed laser to provide circularly polarized laser pulses into the electro-optic modulator EOM (such as a Pockels cell) 530. If the laser pulses are reflected the PBS 520, they are directed into a sink 560. The electro-optic modulator 530 is driven by a waveform driver 540. The modulated output from the electro-optic modulator is split by the second PBS 550 into output 1 and output 2 according to their respective polarization states.

The EOM modulation waveform is generated by the waveform driver 540. The waveform drive includes a custom circuit to lock to the laser and create a phase locked signal, with the ability to step phase shift that signal, to a RF power amplifier which drives a transformer, providing the AC voltage to the EOM. In one embodiment, a sinusoidal waveform, which is representative of the EOM modulation waveform, is expressed as:

$$v_s(t) = V_P \sin(2\pi f t + \varphi),$$

where $V_P$ is the amplitude, or "Peak Amplitude" of the waveform, f is frequency in Hz, and $\varphi$ is the phase in radians.

A periodic impulse train, which is representative of pulsed lasers, is expressed as:

$$p(t) = \sum_{n=-\infty}^{\infty} \delta(t - nT_s)$$

where $T_s$ is the period of the pulses going around the delay loop. This means that the series of laser pulses arrive at t=0, $t=T_s$, $t=2T_s$, ..., etc. Now the phase of the EOM drive sinusoid is relative to this and is defined by $\varphi$. The voltage on the EOM is relevant only at the instant in time when the laser pulse is present in the EOM material (crystal). That means the voltage on the sinusoidal waveform is relevant only at time t=0, $t=T_s$, $t=2T_s$, ..., etc. The drive voltage is thus the sinusoid equation evaluated at those instants in time, and now looks like a discrete-time sampled signal:

$$v_s(nT_s) = V_P \sin(2\pi f n T_s + \varphi), n=0, 1, 2, \ldots$$

When the sinusoidal waveform is synchronized with the successive delayed pulses, we have $f=1/T_s$=repetition rate of the series of pulses of reducing amplitude. The amplitude reduction of the series of pulses can be adjusted by changing the phase of the EOM drive $\varphi$.

The present disclosure overcomes the limits in the dynamic range of the traditional detection/digitization system by creating a series of pulses of reducing amplitude, and then using knowledge of the pulse intensity, location on the test sample, and amount of fluorescence measured to assemble a high dynamic range final image. Thus, embodiments of the present invention represent significant improvements over existing microscopic imaging technology.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

Although particular parameters used with particular embodiments of the microscope are mentioned herein, it is understood that the invention is not limited to any particular parameters that have been used with particular embodiments. All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An imaging system comprising:
   a light source configured to generate successive light pulses of diminishing intensity having a pulse interval; and
   a microscopy system configured to image a sample and to process signals detected from the sample based on intensities of the successive light pulses;
   wherein the microscopy system comprises a detector having a plurality of temporal buffers configured to store detected light signals from the sample for the successive light pulses at different times, each corresponds to a light pulse of different intensity; and
   the microscope system further comprising a processor configured to process data in a temporal buffer that corresponds to one of the successive light pulses in which the detected light signal does not saturate the temporal buffer.

2. The imaging system of claim 1, wherein the light source comprises:
   a pulse laser configured to generate light pulses having a repetition interval;
   a first beam splitter configured to receive a light pulse and to direct a first percentage of the light pulse onto a delay loop and output a second percentage of the light pulse to the microscopy system;
   wherein the delay loop is configured to direct the first percentage of light pulse back to the first beam splitter with a time delay; and
   wherein the system is configured to, by having continued looping of a light pulse in the delay loop, output successive light pulses of diminishing intensity with the pulse interval being equal to the time delay.

3. The imaging system of claim 2, wherein the delay loop comprises a path that traverses:
   the first beam splitter;
   a first mirror;
   a second mirror;
   a half-wave plate; and
   a second beam splitter;
   wherein the first and second mirrors are configured to direct the first percentage of the light pulse through the half-wave plate to the second beam splitter, the half-wave plate changing the polarization state of the light pulse;
   wherein the second beam splitter is a polarizing beam splitter configured to receive the first percentage of the light pulse from the half-wave plate and reflect the first percentage of the light pulse having a second polarization state to the first beam splitter; and
   wherein the second beam splitter is further configured to receive the light pulse from the pulse laser and transmit the light pulse having a first polarization state to the first beam splitter.

4. The imaging system of claim 2, wherein the time delay introduced by the delay loop is shorter than the repetition interval.

5. The imaging system of claim 2, wherein the time delay in the delay loop is configurable.

6. The imaging system of claim 2, wherein the first and second percentages are configurable.

7. The imaging system of claim 1, wherein the microscopy system comprises:
   a sample objective; and
   one or more optical elements configured to direct the successive light pulses to the sample objective;
   wherein the sample objective is configured to focus the successive light pulses at a focal plane within the sample;
   wherein the detector is configured to detect light emitted from the focal plane within the sample in response to the focused successive light pulses.

8. The imaging system of claim 7, wherein, for each imaging spot, the processor is further configured to select the data in the temporal buffer that corresponds to the highest intensity pulse among those pulses that do not cause a temporal buffer saturation.

9. The imaging system of claim 7, wherein the one or more optical elements comprises a scan unit configured to scan the focused light pulses within the focal plane.

10. The imaging system of claim 7, wherein each of the light pulses provides excitation light to the sample such that the detected emitted light is fluorescence emission light in response to the focused excitation light.

11. The imaging system of claim 10, wherein a wavelength of the excitation light is two times as long as a wavelength of the fluorescence emission light, which is generated in response to a two-photon excitation process.

12. The imaging system of claim 10, wherein the pulse interval is longer than the duration of the fluorescence emission.

13. The imaging system of claim 1, wherein the light source comprises:
   a pulse laser configured to generate light pulses; and
   a synchronous electro-optic modulator (SEOM) with a delay loop;
   wherein the SEOM comprises:
     a quarter wave plate;
     a first polarizing beam splitter or polarizer;
     an electro-optic modulator (EOM);
     circuitry configured to drive the SEOM with a drive waveform, the drive waveform being a phase-coherent sinusoidal waveform at a period equal to a time delay in the delay loop; and
     a second polarizing beam splitter;
     wherein the SEOM is arranged to direct the laser pulses from the laser source through the half wave plate, the first polarizing beam splitter, the EOM, and then to the second polarizing beam splitter;
     wherein the second polarizing beam splitter is configured to split the light pulses from the EOM into an output pulse train having a first polarization state and a loop-back pulse train into the delay loop having a second polarization state.

14. An imaging method comprising:
   generating, by a light source, successive light pulses of diminishing intensity having a pulse interval;
   imaging a sample and processing signals detected from the sample based on intensities of the successive light pulses;
   storing detected light signals from the sample for the successive light pulses in a plurality of temporal buffers at different times, each corresponds to a light pulse of different intensity, and
   processing data in a temporal buffer that corresponds to one of the successive light pulses in which the detected light signal does not saturate the temporal buffer.

15. The imaging method of claim 14, wherein the generating the successive light pulses of diminishing intensity having a pulse interval comprises:

generating, by a pulse laser, light pulses having a repetition interval;

receiving, by a first beam splitter, a light pulse and directing a first percentage of the light pulse onto a delay loop and outputting a second percentage of the light pulse for imaging the sample;

directing, by the delay loop, the first percentage of light pulse back to the first beam splitter with a time delay; and by having continued looping of a light pulse in the delay loop, outputting successive light pulses of diminishing intensity with the pulse interval being equal to the time delay.

16. The imaging method of claim 15, wherein the delay loop comprises a path that traverses:
the first beam splitter;
a first mirror;
a second mirror;
a half-wave plate; and
a second beam splitter;
wherein the first and second mirrors are configured to direct the first percentage of the light pulse through the half-wave plate to the second beam splitter, the half-wave plate changing the polarization state of the light pulse;
wherein the second beam splitter is a polarizing beam splitter configured to receive the first percentage of the light pulse from the half-wave plate and reflect the first percentage of the light pulse having a second polarization state to the first beam splitter; and
wherein the second beam splitter is further configured to receive the light pulse from the pulse laser and transmit the light pulse having a first polarization state to the first beam splitter.

17. The imaging method of claim 15, wherein the time delay introduced by the delay loop is shorter than the repetition interval.

18. The imaging method of claim 15, wherein the time delay in the delay loop is configurable.

19. The imaging method of claim 15, wherein the first and second percentages are configurable.

20. The imaging method of claim 14, further comprising:
directing, by one or more optical elements, the successive light pulses to a sample objective;
focusing, by the sample objective, the successive light pulses at a focal plane within the sample;
detecting, by a detector, light emitted from the focal plane within the sample in response to the focused successive light pulses.

21. The imaging method of claim 20, further comprising, for each imaging spot, selecting the data in the temporal buffer that corresponds to the highest intensity pulse among those pulses that do not cause a temporal buffer saturation.

22. The imaging method of claim 20, wherein the one or more optical elements comprises a scan unit, and the method further comprises scanning the focused light pulses within the focal plane.

23. The imaging method of claim 20, wherein each of the light pulses provides excitation light to the sample such that the detected emitted light is fluorescence emission light in response to the focused excitation light.

24. The imaging method of claim 23, wherein a wavelength of the excitation light is two times as long as a wavelength of the fluorescence emission light, which is generated in response to a two-photon excitation process.

25. The imaging method of claim 23, wherein the pulse interval is longer than the duration of the fluorescence emission.

* * * * *